United States Patent
Yamazaki et al.

(10) Patent No.: US 7,631,428 B2
(45) Date of Patent: Dec. 15, 2009

(54) RACK AND PINION STEERING APPARATUS AND METHOD OF MANUFACTURING RACK SHAFT

(75) Inventors: Takayasu Yamazaki, Kyoto (JP); Shirou Nakano, Osaka (JP); Hironori Yamato, Nara (JP); Youjirou Kakoki, Nara (JP)

(73) Assignee: JTEKT Corporation, Osaka (JP)

( * ) Notice: Subject to any disclaimer, the term of this patent is extended or adjusted under 35 U.S.C. 154(b) by 751 days.

(21) Appl. No.: 10/999,808

(22) Filed: Nov. 29, 2004

(65) Prior Publication Data

US 2005/0139026 A1 Jun. 30, 2005

(30) Foreign Application Priority Data

Nov. 27, 2003 (JP) ............................. 2003-397690

(51) Int. Cl.
  *B21D 53/28* (2006.01)
  *B62D 5/06* (2006.01)
  *F16H 35/00* (2006.01)

(52) U.S. Cl. .............. 29/893.35; 74/388 R; 74/388 PS; 180/428; 180/431

(58) Field of Classification Search ................ 29/893.2, 29/893.35; 74/422, 388 PS, 388 R; 75/386; 180/428, 431, 444; 148/631
See application file for complete search history.

(56) References Cited

U.S. PATENT DOCUMENTS

| | | | | |
|---|---|---|---|---|
| 1,998,108 A | * | 4/1935 | Waisner | 428/592 |
| 3,928,022 A | * | 12/1975 | Langagne | 75/386 |
| 4,098,624 A | * | 7/1978 | Laird, Jr. | 148/631 |
| 4,646,554 A | | 3/1987 | Wallis et al. | |
| 5,069,080 A | * | 12/1991 | Simon | 74/422 |
| 5,108,518 A | * | 4/1992 | Fukui et al. | 148/603 |
| 5,473,960 A | * | 12/1995 | Sakamoto et al. | 74/422 |
| 5,499,550 A | * | 3/1996 | Westphal et al. | 74/422 |
| 6,508,981 B1 | * | 1/2003 | Perrin et al. | 420/28 |
| 6,588,293 B2 | * | 7/2003 | Tsubouchi et al. | 74/422 |
| 6,598,697 B2 | * | 7/2003 | Oishi | 180/428 |
| 7,159,434 B2 | * | 1/2007 | Yoshimura et al. | 72/275 |
| 2003/0007882 A1 | * | 1/2003 | Perrin et al. | 420/22 |

FOREIGN PATENT DOCUMENTS

| | | |
|---|---|---|
| EP | 1215102 | 6/2002 |
| GB | 995965 | 6/1965 |
| GB | 2372952 | 9/2002 |
| JP | 08-025462 B2 | 5/1991 |
| JP | 06-264992 A | 9/1994 |
| JP | 08-025462 B2 | 3/1996 |
| JP | 2004237316 | 8/2004 |

\* cited by examiner

*Primary Examiner*—David P Bryant
*Assistant Examiner*—Alexander P Taousakis
(74) *Attorney, Agent, or Firm*—Darby & Darby P.C.

(57) ABSTRACT

A rack and pinion steering apparatus which does not need quenching of the rack shaft after gear cutting of the rack shaft in manufacturing processes is provided. The rack and pinion steering apparatus comprises a pinion shaft and a rack shaft meshing with the pinion shaft. The rack shaft is formed to have a substantially uniform hardness.

1 Claim, 3 Drawing Sheets

RACK AND PINION STEERING APPARATUS AND METHOD OF MANUFACTURING RACK SHAFT

CROSS-REFERENCE TO RELATED APPLICATION

This non-provisional application claims priority under 35 U.S.C. §119(a) on Patent Application No. 2003-397690 filed in Japan on Nov. 27, 2003, the entire contents of which are hereby incorporated by reference.

BACKGROUND OF THE INVENTION

The present invention relates to a rack and pinion steering apparatus, which is used extensively as a steering apparatus for vehicles, and a method of manufacturing a rack shaft of a rack and pinion steering apparatus.

A rack and pinion steering apparatus comprises a pinion shaft, which is connected to a steering member such as a steering wheel and is provided with pinion teeth formed on the surface thereof, and a rack shaft, which extends from the right and left sides of a vehicle body and is provided with rack teeth juxtaposed on the outer surface of a middle portion thereof over a proper length. The rack and pinion steering apparatus is constructed to transform the rotation of the pinion shaft in accordance with the manipulation of the steering member by the driver into the axial movement of the rack shaft and to activate wheels for steering (right and left front wheels, in general) connected to the right and left ends of the rack shaft via respective steering tie rods.

In such a rack and pinion steering apparatus, the pinion teeth on the pinion shaft and the rack teeth on the rack shaft are generally formed through a cutting process using a metal cutting machine tool such as a gear cutting machine or a broaching machine in order to obtain high mesh accuracy, and the tooth flank often undergoes a heat treatment in order to increase the surface hardness and the durability (see, for example, Japanese Patent Application Laid Open No. H06-264992 and Japanese Patent Application Publication No. H08-25462).

In manufacturing of the rack shaft of the rack and pinion steering apparatus mentioned above, the rack shaft conventionally undergoes a gear cutting and then a heat treatment such as the induction quenching and tempering for the purpose of surface hardening. In the heat treatment, there is a problem that a straightening process for eliminating distortion, which may occur at the tooth flank or the shaft portions, becomes a major obstacle to the manufacturing processes. Moreover, there is another problem that the quenching may cause defects such as a quench crack.

BRIEF SUMMARY OF THE INVENTION

The present invention has been made with the aim of solving the above problems, and it is an object of the first invention to provide a rack and pinion steering apparatus which does not need quenching of the rack shaft after gear cutting of the rack shaft in manufacturing processes. The object of the second invention is to provide a method of manufacturing a rack shaft which does not need quenching after gear cutting.

A rack and pinion steering apparatus according to the present invention, which comprises a pinion shaft and a rack shaft meshing with the pinion shaft, is characterized in that the rack shaft has a uniform hardness.

A method of manufacturing a rack shaft of a rack and pinion steering apparatus according to the present invention is characterized by comprising steps of: refining an entire rod-shaped material to have hardness necessary for meshing with a pinion shaft; then drawing the rod-shaped material to uniform the outer diameter; forming end portions of the rod-shaped material into a predetermined shape; and then gear-cutting the rod-shaped material to finish the rack shaft.

A method of manufacturing a rack shaft of a rack and pinion steering apparatus according to the present invention is characterized by comprising steps of: quenching a rod-shaped material formed of CrMo steel to generate a martensitic structure; tempering the rod-shaped material at a temperature of 400 to 650° C. to generate a fine mixed structure of cementite and ferrite and to refine the rod-shaped material to have a Brinell hardness of approximately 300 to 360; drawing the rod-shaped material so as to be a round bar having a substantially uniform outer diameter; forming end portions of the rod-shaped material into a predetermined shape; and gear-cutting the rod-shaped material to finish the rack shaft.

With the present invention, a rack and pinion steering apparatus which does not need quenching of the rack shaft after gear cutting of the rack shaft in manufacturing processes can be realized. Moreover, wear in a boundary portion of the pinion tooth flank to be contacted with the rack teeth, for example, can be reduced drastically (the rack tooth flank does not hit the pinion tooth flank and the rack follows the pinion) and the performance of the pinion, which is conventionally unfavorable in strength and durability, can be enhanced. Moreover, the incidence of a crack or a chip in the rack teeth can be reduced drastically. Moreover, a drastic reduction in cost can be realized since processes such as quenching and tempering as well as straightening after gear cutting of the rack shaft can be eliminated. Moreover, the quality of the rack shaft is raised since the rack shaft does not have distortion due to a heat treatment after gear cutting which may cause defects such as a quench crack.

With the method of manufacturing a rack shaft according to the present invention, a rack shaft which does not need quenching after gear cutting can be manufactured. Moreover, wear in a boundary portion of the pinion tooth flank to be contacted with the rack teeth, for example, can be reduced drastically (the rack tooth flank does not hit the pinion tooth flank and the rack follows the pinion) and the performance of the pinion, which is conventionally unfavorable in strength and durability, can be enhanced. Moreover, the incidence of a crack or a chip in the rack teeth can be reduced drastically. Moreover, a drastic reduction in cost can be realized since processes such as quenching and tempering as well as straightening after gear cutting of the rack shaft can be eliminated. Moreover, the quality of the rack shaft is raised since the rack shaft does not have distortion due to a heat treatment after gear cutting which may cause defects such as a quench crack.

The above and further objects and features of the invention will more fully be apparent from the following detailed description with accompanying drawings.

DETAILED DESCRIPTION OF THE INVENTION

Figure 1:
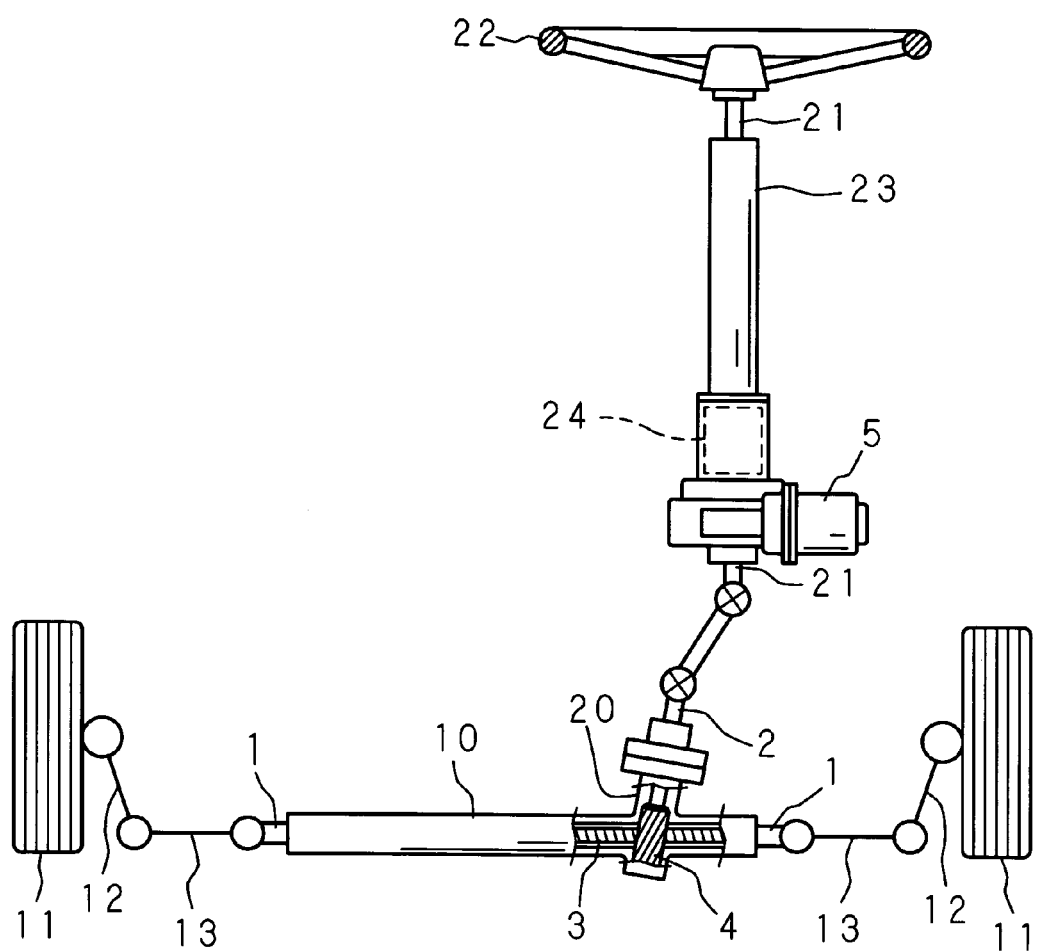
FIG. 1 is a schematic view illustrating the structure of an embodiment of a rack and pinion steering apparatus according to the present invention.

The following description will explain the present invention with reference to the drawings illustrating an embodiment thereof. FIG. 1 is a schematic view illustrating the structure of an embodiment of a rack and pinion steering apparatus according to the present invention. This rack and pinion steering apparatus comprises, a rack shaft 1 supported so as to be freely movable in the axial direction extends from the right and left sides of a vehicle body, which is not illustrated in the figure, within a cylindrical rack housing 10. The ends of the rack shaft 1, which project from the both sides of the rack housing 10, are connected to steering knuckle arms 12, 12 of the right and left front wheels 11, 11, which serve as wheels for steering, via respective steering tie rods 13, 13.

A pinion housing 20 is arranged to extend in the proximity of a side end portion of the rack housing 10 with the axis thereof crossing the rack housing 10, and a pinion shaft 2 is supported in the pinion housing 20 so as to be freely rotatable on the axis thereof. A part of the pinion shaft 2 projects upward from the pinion housing 20 in a proper length, and the projecting end is connected to a steering wheel 22, which is a steering member, via a column shaft 21.

The lower half of the pinion shaft 2, which extends within the pinion housing 20, has a larger diameter over a proper length, and pinion teeth 4 are formed on the outer surface of this portion having a larger diameter. Meanwhile, rack teeth 3 are formed on the outer surface of a rack shaft 1, which is supported in the rack housing 10, in a proper length including a portion opposing the pinion shaft 2, and a rack tooth 3 meshes with the pinion tooth 4 formed on the surface of the pinion shaft 2.

With the above structure, when the driver turns the steering wheel 22 to steer the vehicle, the pinion shaft 2 connected to the steering wheel 22 via the column shaft 21 rotates, and this rotation is transformed into an axial movement of the rack shaft 1 at the meshing portion of a pinion tooth 4 and a rack tooth 3 so that the rack shaft 1 moves right or left.

The movement of the rack shaft 1 caused in such a manner is transmitted to the right and left steering knuckle arms 12, 12 via the steering tie rods 13, 13 connected to the ends of the rack shaft 1, and a push or pull of the steering knuckle arms 12, 12 causes the right and left front wheels 11, 11 to turn in a direction corresponding to the manipulated direction of the steering wheel 22 by an angle corresponding to the manipulated variable so that the vehicle is steered.

It should be noted that the rack and pinion steering apparatus illustrated in FIG. 1 is constructed as an electric power steering apparatus comprising a motor 5 for assisting such steering. The steering assist motor 5 is mounted on the outer surface in the proximity of the lower end portion of a cylindrical column housing 23 for supporting the column shaft 21, so as to cross the column shaft 21 provided therein at an approximately right angle. The rotation of the motor 5 is transmitted to the column shaft 21 via a worm gear reduction unit, which is not illustrated in the figure, constructed within the column housing 23. In the column housing 23, a torque detecting apparatus 24 for detecting a running torque (steering torque) applied to the column shaft 21 is constructed above a mounting portion of the motor 5. A steering torque detected by the torque detecting apparatus 24 is used for controlling the drive of the steering assist motor 5.

With the above structure, when the driver turns the steering wheel 22, the torque detecting apparatus 24 detects a steering torque applied to the column shaft 21 associated with the turn of the steering wheel 22. Rotational force of the steering assist motor 5, which is driven in a controlled manner based on the detected torque, is applied to the column shaft 21 and then transmitted from the column shaft 21 to the pinion shaft 2, and axial movement force is applied to the rack shaft 1, so that the movement assists the steering described above.

Figure 2:
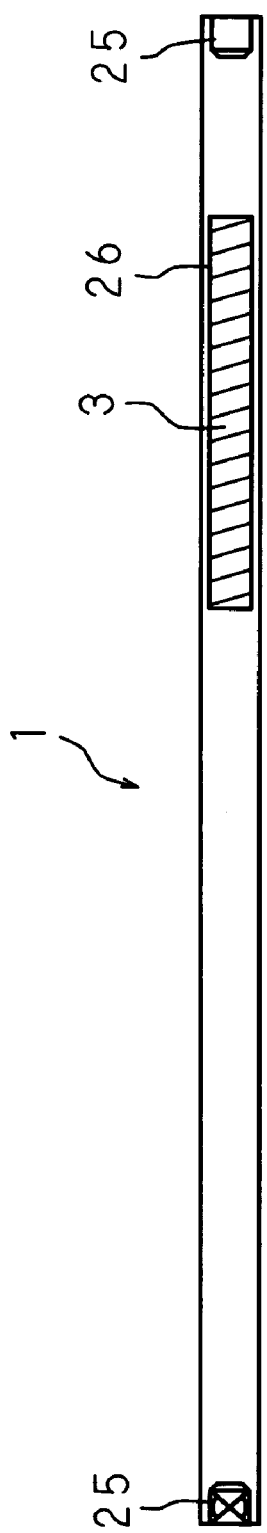
FIG. 2 is a full view illustrating an example of a rack shaft of a rack and pinion steering apparatus according to the present invention.

FIG. 2 is a full view illustrating an example of the rack shaft 1 of a rack and pinion steering apparatus according to the present invention. The rack shaft 1 is rod-shaped having a circular cross section and the end portions thereof form connecting portions 25 to be connected with the steering tie rods 13. The outer surface in the proximity of a side end portion of the rack shaft 1 is provided with a flat face 26 having a proper width and a proper axial length corresponding to the movement stroke length. The rack teeth 3 are formed through a cutting process (gear cutting) of the flat face 26 using a metal cutting machine tool, such as a gear cutting machine or a broaching machine, capable of planing. The rack teeth 3 are formed as helical teeth inclined at a predetermined angle with respect to a direction perpendicular to the axial direction of the rack shaft 1.

The specifications of the rack teeth 3 and the pinion teeth 4 are decided so that the pinion teeth 4 arranged on the circumference of the pinion shaft 2 fixed by a required stroke ratio of the rack shaft 1 are strong enough to withstand the manipulation force of the steering wheel 22 and the rotational force of the motor 5 to be loaded as described above and so that the tooth flank stress is reduced.

Figure 3:
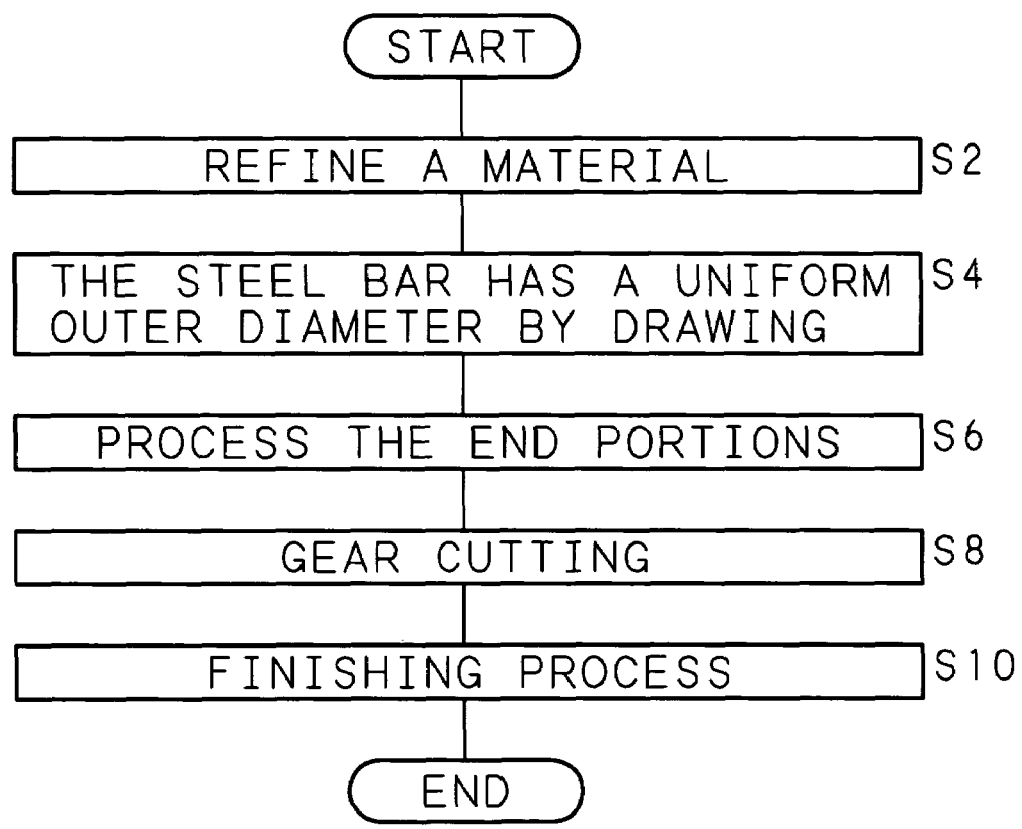
FIG. 3 is a flow chart showing a method of manufacturing a rack shaft according to the present invention.

FIG. 3 is a flow chart showing a method of manufacturing a rack shaft according to the present invention, e.g. a method of manufacturing the rack shaft 1 described above. In manufacturing of the rack shaft 1, first, a steel bar material (rod-shaped material) is refined so that the entire steel bar has a hardness high enough to withstand the load, which is necessary for the rack teeth 3 incorporated in the rack and pinion steering apparatus (S2). The refining is a process for obtaining characteristics superior in strength and toughness by quenching the steel bar to generate a martensitic structure and then tempering the steel bar at a relatively high temperature (400 to 650° C.) to generate a fine mixed structure of cementite and ferrite. Used as a material to be refined (material) is SCM440 (CrMo steel), for example. The hardness of the material is approximately HB (Brinell hardness) 300 to 360, for example.

Next, the steel bar undergoes drawing while passing through a dies having a bore of a predetermined circular form so that the steel bar has a uniform outer diameter of the rack shaft 1 (S4). Then, the end portions of the steel bar undergo a process to form the connecting portions 25 (S6). Then, the flat face 26 with a proper width is provided on the outer surface in the proximity of a side end portion of the steel bar, the rack teeth 3 are formed through a cutting process (gear cutting) of the flat face 26 using a gear cutting machine, a broaching machine or the like (S8), and then a finishing process such as surface polishing is performed (S10) to complete the rack shaft 1.

It should be noted that, though explained in the above embodiment is a rack and pinion steering apparatus constructed as an electric power steering apparatus, which comprises a steering assist motor between the steering member and the pinion shaft so as to assist steering associated with the rotation of the pinion shaft by transmitting rotational force of the motor to the pinion shaft, namely, a column assist electric power steering apparatus, the present invention may be applied to a rack and pinion steering apparatus constructed as an electric power steering apparatus of other types. Moreover, it is needless to say that the present invention may also be applied to a rack and pinion steering apparatus constructed as a manual steering apparatus, which steers the vehicle using only a steering torque applied to the steering wheel 22 by the driver, or to a rack and pinion steering apparatus constructed as a hydraulic power steering apparatus, which assists steering by applying to the rack shaft 1 force generated by a hydraulic cylinder provided in the middle of the rack housing 10.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of manufacturing a rack shaft of a rack and pinion steering apparatus, comprising steps of:

quenching a rod-shaped material formed of CrMo steel to generate a martensitic structure;

tempering the rod-shaped material at a temperature of 400 to 650° C. to generate a fine mixed structure of cementite and ferrite and to refine the rod-shaped material to have a Brinell hardness of approximately 300 to 360;

drawing the rod-shaped material so as to be a round bar having a substantially uniform outer diameter;

forming end portions of the rod-shaped material into a predetermined shape; and gear-cutting the rod-shaped material to finish the rack shaft.

* * * * *